(12) United States Patent
Hishikawa

(10) Patent No.: US 8,741,994 B1
(45) Date of Patent: Jun. 3, 2014

(54) ALKOXYSILYL GROUP-CONTAINING AZO COMPOUND AND RUBBER COMPOSITION USING THE SAME

(71) Applicant: Toyo Tire & Rubber Co., Ltd., Osaka (JP)

(72) Inventor: Yasuhiro Hishikawa, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 14/070,878

(22) Filed: Nov. 4, 2013

(30) Foreign Application Priority Data

Dec. 13, 2012 (JP) .................................. 2012-272310
Dec. 13, 2012 (JP) .................................. 2012-272312
May 17, 2013 (JP) .................................. 2013-105174

(51) Int. Cl.
*C08K 5/54* (2006.01)
*C09B 43/00* (2006.01)

(52) U.S. Cl.
USPC ........................... 524/188; 534/593; 534/726

(58) Field of Classification Search
USPC .................... 524/188; 534/593, 726
See application file for complete search history.

(56) References Cited

FOREIGN PATENT DOCUMENTS

| JP | 04-112893 A | 4/1992 |
| JP | 08-104710 A | 4/1996 |
| JP | 2510345 B2 | 6/1996 |

*Primary Examiner* — John Uselding

(74) *Attorney, Agent, or Firm* — Westerman, Hattori, Daniels & Adrian, LLP

(57) ABSTRACT

An alkoxysilyl group-containing azo compound represented by the following formula (1), a method for easily obtaining the alkoxysilyl group-containing azo compound, and a rubber composition having improved heat build-up characteristic and the like obtained using the azo compound are provided. The alkoxysilyl group-containing azo compound is preferably obtained by reacting a compound represented by the following formula (2) and a compound represented by the following formula (3):

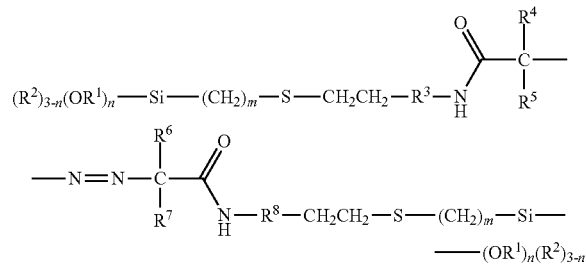

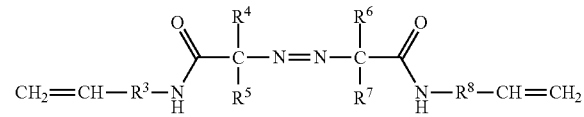

wherein $R^1$ and $R^2$ represent an alkyl group having from 1 to 3 carbon atoms, $R^3$ and $R^8$ represent an alkylene group having from 1 to 3 carbon atoms, $R^4$, $R^5$, $R^6$ and $R^7$ represent hydrogen or an alkyl group having from 1 to 3 carbon atoms, n is an integer of from 1 to 3, and m is an integer of from 1 to 5.

7 Claims, No Drawings

ALKOXYSILYL GROUP-CONTAINING AZO COMPOUND AND RUBBER COMPOSITION USING THE SAME

BACKGROUND OF THE INVENTION

1. Field of the Invention

The present invention relates to a novel alkoxysilyl group-containing azo compound usable as a radical generator having reactivity with silica and a metal oxide, a method for producing the azo compound, a rubber composition using the azo compound, and a pneumatic tire using the rubber composition.

2. Background Art

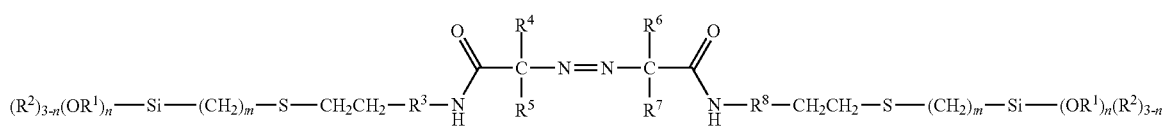

When silica is used in a rubber composition, various sulfur-containing silane coupling agents are used for the purpose of improving dispersion of silica. Performance of a rubber is influenced by a silane coupling agent added. Therefore, for example, a silane coupling agent capable of improving performance such as less heat build-up required in a tire is demanded.

A polymer having a functional group introduced in a molecular terminal is useful because the functional group can be used for a crosslinking reaction of the polymer and stabilization of dispersion of a filler such as silica particles. Particularly, in the case of a polymer having an alkoxysily group at a terminal, the polymer can be expected to form a crosslinking point by polycondensation and to act as a silane coupling agent that is hydrolyzed to react with a surface of an inorganic material such as silica particles.

Regarding the introduction of a terminal functional group in a polymer, for example, JP-A-8-104710 (1996) describes that alkoxysilanes having an isocyanate group are reacted with an azo compound having a functional group that reacts with the isocyanate group to form a macroazo radical initiator, and an alkoxysilyl group-terminated vinyl polymer is obtained using the radical initiator.

Japanese Patent No. 2510345 discloses an alkoxysilyl group-containing azo compound that can provide a novel polymerization method, as a radical polymerization initiator, and describes that the compound can be used in the same way as a silane coupling agent. A method for reacting an ester group or amide group-containing azo compound is reacted with an alkoxysilyl group-containing primary amine in the presence of a metal alkoxide catalyst is disclosed as a production method of the compound.

However, an isocyanate group and a metal alkoxide used in a production method of the above-described conventional technique have high reactivity with water, and therefore have the problem that synthesis conditions are strictly restricted in any of the production methods, and productivity is low. From the above facts, an alkoxysilyl group-containing azo compound does not yet result in practical use as a silane coupling agent.

SUMMARY OF THE INVENTION

The present invention has been made in view of the above circumstances, and one object of the present invention is to provide a novel alkoxysilyl group-containing azo compound usable as a radical generator. Another object of the present invention is to provide a method for producing an alkoxysilyl group-containing azo compound that is reactive even though water is present, in high productivity. Still another object of the present invention is to provide a rubber composition having various improved performances of a rubber such as less heat build-up using the alkoxysilyl group-containing azo compound as a novel silane coupling agent.

To overcome the above problems, the alkoxysilyl group-containing azo compound of the present invention is represented by the following formula (1):

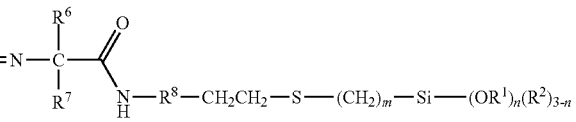

wherein $R^1$ and $R^2$ each independently represent an alkyl group having from 1 to 3 carbon atoms, $R^3$ and $R^8$ each independently represent an alkylene group having from 1 to 3 carbon atoms, $R^4$, $R^5$, $R^6$ and $R^7$ each independently represent hydrogen or an alkyl group having from 1 to 3 carbon atoms, n is an integer of from 1 to 3, and m is an integer of from 1 to 5.

The method for producing the alkoxysilyl group-containing azo compound of the present invention comprises reacting a compound represented by the following formula (2):

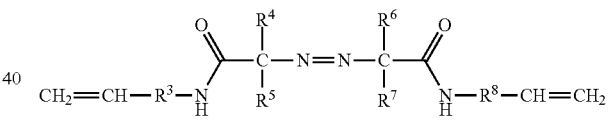

wherein $R^3$ and $R^8$ each independently represent an alkylene group having from 1 to 3 carbon atoms, and $R^4$, $R^5$, $R^6$ and $R^7$ each independently represent hydrogen or an alkyl group having from 1 to 3 carbon atoms;

and a compound represented by the following formula (3):

$$HS-(CH_2)_m-Si(OR^1)_n(R^2)_{3-n} \qquad (3)$$

wherein $R^1$ and $R^2$ each independently represent an alkyl group having from 1 to 3 carbon atoms, n is an integer of from 1 to 3, and m is an integer of from 1 to 5, thereby producing the alkoxysilyl group-containing azo compound represented by the formula (1).

The above production method can use a radical generator as a reaction catalyst.

The alkoxysilyl group-containing azo compound of the present invention has an alkoxysilyl group having reactivity with silica or the like. Therefore, when the azo compound is used as, for example, a radical generator, a polymer having an alkoxysilyl group at one end or both ends is obtained.

According to the production method of the present invention as described above, mercaptoalkoxysilane is added to a terminal alkenyl group of an azo compound by an thiol-ene reaction. Therefore, the alkoxysilyl group-containing azo compound of the present invention can be efficiently obtained even in the presence of water.

The rubber composition of the present invention comprises the azo compound represented by the formula (1).

In the rubber composition of the present invention, the azo compound represented by the formula (1) is preferably represented by the following formula (1'):

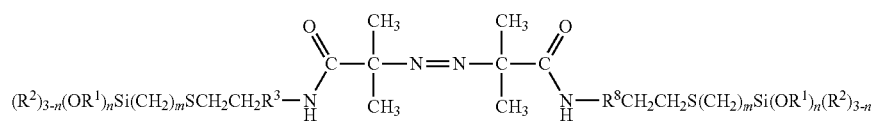

(1')

wherein $R^1$, $R^2$, $R^3$, $R^8$, n and m are the same as defined in the formula (1).

A pneumatic tire of the present invention is obtained using the rubber composition of the present invention.

According to the rubber composition of the present invention, heat build-up of a rubber can be decreased by using the alkoxysilyl group-containing azo compound represented by the formula (1) as a silane coupling agent. The alkoxysilyl group-containing azo compound generates carbon radicals by thermal decomposition and bonds to a rubber molecule by carbon-carbon bond. Therefore, it is considered that formation of strong bond contributes to the decrease in heat build-up of a rubber, that is, the improvement in less heat build-up characteristic, as compared with the conventional polysulfide silane coupling agent.

DETAILED DESCRIPTION OF THE INVENTION

The embodiment for carrying out the present invention is described in detail below.

The alkoxysilyl group-containing azo compound of the present invention has a structure as represented by the formula (1). The compound of the present invention represented by the formula (1) is sometimes hereinafter referred to as "azo compound (1)" for simplicity.

In the formula (1), $R^1$ and $R^2$ each independently represent an alkyl group having from 1 to 3 carbon atoms, $R^3$ and $R^8$ each independently represent an alkylene group having from 1 to 3 carbon atoms, $R^4$, $R^5$, $R^6$ and $R^7$ each independently represent hydrogen or an alkyl group having from 1 to 3 carbon atoms, n is an integer of from 1 to 3, and m is an integer of from 1 to 5.

$R^1$, $R^2$, $R^3$, $R^4$, $R^5$, $R^6$, $R^7$, $R^8$, n and m are preferably selected from the above ranges depending on the intended use of the azo compound (1). For example, when a polymer that can be used as a silane coupling agent is produced using the azo compound (1) as a radical generator, $R^1$ and $R^2$ are preferably a methyl group or an ethyl group, $R^3$ and $R^8$ are preferably an alkylene group having from 1 to 3 carbon atoms, and $R^4$, $R^5$, $R^6$ and $R^7$ are preferably hydrogen or an alkyl group having from 1 to 3 carbon atoms. n is preferably 3, and m is preferably 2 to 4, and particularly preferably 3.

As the provisory clause of the formula (1) describes as "each independently", $R^1$, $R^2$, n and m in a group bonded to one terminal of an azo group may the same as or different from $R^1$, $R^2$, n and m in a group bonded to the other terminal of an azo group. Furthermore, $R^3$ and $R^8$ may be the same or different, respectively, and $R^4$ and $R^5$, and $R^6$ and $R^7$, may be the same or different, respectively. In other words, the azo compound (1) may be bilaterally symmetric or may be bilaterally asymmetric, centered on the azo group.

However, when the azo compound (1) is used as a radical generator, if the azo compound (1) is bilaterally asymmetric centered on the azo group, two kinds of radicals having different structures and reactivities are generated. As a result, a reaction product obtained using the azo compound (1) is a mixture of two kinds or more, and molecular weight distribution is generally wide. Therefore, for example, to obtain a polymer having narrow molecular weight distribution, the azo compound (1) is preferably bilaterally symmetric.

The azo compound (1) of the present invention is obtained by thiol-ene reaction between a thiol group of mercaptoalkoxysilane represented by the formula (3) (hereinafter referred to as "compound (3)") and a terminal alkenyl group of the azo compound represented by the formula (2) (hereinafter referred to as "compound (2)"). The thiol-ene reaction is a addition reaction that a thiol group and a carbon-carbon double bond are added to each other in 1:1.

Specifically, thiyl radicals are easily generated by UV irradiation or a radical initiator such as a peroxide and add to a carbon-carbon double bond. When a carbon radical generated abstracts hydrogen from a thiol group, 1:1 adduct is formed. The radical from which hydrogen has been abstracted converts into a thiyl radical, and as a result, a reaction proceeds in a chain form.

The azo compound (1) of the present invention is formed by the thiol-ene addition reaction between the compound (2) and the compound (3) as described above. Therefore, $R^3$, $R^4$, $R^5$, $R^6$, $R^7$ and $R^8$ in the compound (2), $R^1$, $R^2$, n and m in the compound (3) are selected such that the intended azo compound (1) is obtained. The compound (2) and the compound (3) may be used alone in one kind, or may be used as mixtures of two kinds or more, depending on the intended use of the azo compound (1).

The amounts of the compound (2) and the compound (3) used in the production method of the present invention are adjusted such that the compound (3) is introduced in both terminals of the compound (2). Specifically, the proportion of the thiol group in the compound (3) is preferably 1 mol or more, and more preferably from 1 to 1.2 mol, per 1 mol of the alkenyl group in the compound (2).

In the thiol-ene reaction used in the production method of the present invention, a radical generator as a reaction catalyst is not always necessary. However, when a radical generator is used, reaction can be carried out more easily. The kind and the like of the radical generator are not particularly limited. 10 hour Half-life temperature (T10) is preferably lower than that of the compound (2) and the intended azo compound (1) by 5° C. or more, more preferably by 15° C. or more, and particularly preferably from 30 to 70° C.

Specific examples of the usable radical generator include azo compounds such as 2,2'-azobis(4-methoxy-2,4-dimethylvaleronitrile) (T10: 30° C.), 2,2'-azobis(2,4-dimethylvaleronitrile) (ADVN, T10: 51° C.), dimethyl 2,2'-azobis(2-methylpropionate) (T10: 66° C.), 2,2'-azobis(2-methylbutyronitrile) (AMBN, T10: 67° C.), 1,1'-azobis (cyclohexane-1-carbonitrile) (T10: 88° C.) and 2,2'-azobis (isobutyronitrile) (AIBN, T10: 65° C.). Of those, 2,2'-azobis (4-methoxy-2,4-dimethylvaleronitrile) and 2,2'-azobis (2,4- dimethylvaleronitrile) are preferred for the reason that temperature conditions of an thiol-ene addition reaction can be decreased.

Reaction conditions, reaction apparatus and the like for reacting the compound (2) and the compound (3) are appropriately selected according to the conditions and the like conventionally used in the thiol-ene reaction, and are not particularly limited. In general, the reaction is preferably conducted at a temperature of from 20 to 70° C. for about 10 minutes to 3 hours.

The alkoxysilyl group-containing azo compound of the present invention is used to obtain a polymer having an alkoxysilyl group at a terminal as a radical generator as described above, and can further be used as an initiator of iodine transfer polymerization by reacting with iodine in-situ. Furthermore, the azo compound can be utilized as a silane coupling agent for a rubber and a modifier for various polymers. Additionally, a graft polymer can be produced by applying fixing treatment to a surface of a metal oxide or the like and its particles, and then conducting polymerization. The term "fixing" used herein means that the azo compound may be chemically bonded to a surface of a solid substance by hydrolysis or the like of an alkoxy group, may be physically bonded (such as hydrogen bond), or may be trapped in holes on a solid surface. The fixing can be confirmed by measuring as to whether an element in the azo compound is present on a fixing-treated surface after fixing treatment and then washing with an organic solvent or the like using energy dispersive X-ray spectroscopy (EDX), X-ray photoelectron spectroscopy (XPS) or the like.

The rubber composition of the present invention is described below.

The rubber that can be used in the rubber composition of the present invention is not particularly limited, and examples thereof include various diene rubbers such as various natural rubbers (NR), various polyisoprene rubbers (IR), various styrene-butadiene rubbers (SBR) and various polybutadiene rubbers (BR). Those may be used in any one kind or as mixtures of two kinds or more. Styrene-butadiene rubber and various polybutadiene rubbers are preferably used. As necessary, a modified diene rubber having an amino group, an alkoxysilyl group, a hydroxyl group, an epoxy group, a carboxyl group, a cyano group, a halogen or the like introduced therein can be used as those rubbers.

The rubber composition of the present invention can contain reinforcing fillers generally used in the rubber field without particular limitation. It is based on the premise that the rubber composition contains silica in order to obtain the intended effect of the present invention. Examples of other reinforcing fillers include carbon black, talc, clay, aluminum hydroxide and titanium oxide. Of those, carbon black is preferably used. Those reinforcing fillers other than silica can be used alone or as mixtures of two or more thereof.

The amount of the reinforcing fillers added is not particularly limited, and is appropriately adjusted depending on the intended use or the like of a tire member. In general, the amount of silica added is preferably a range of from 10 to 120 parts by mass per 100 parts by mass of the rubber component.

In addition to silica, carbon black is preferably added in an amount of from 5 to 50 parts by mass per 100 parts by mass of the rubber component. Addition ratio between silica and carbon black is particularly preferably within a range of from 1/20 to 1/0.1 as a silica/carbon black ratio.

The alkoxysilyl group-containing azo compound of the present invention having the structure represented by the formula (1) is used in the rubber composition of the present invention. The azo compound represented by the formula (1) is particularly preferably a compound represented by the following formula (1'):

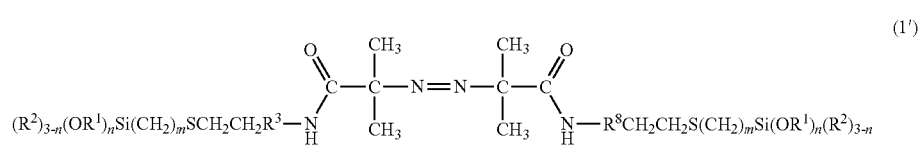

In the formula (1'), $R^1$ and $R^2$ each represent an alkyl group having from 1 to 3 carbon atoms, and each are preferably a methyl group or an ethyl group. $R^3$ and $R^8$ each represent an alkylene group having from 1 to 3 carbon atoms, and each are preferably an alkylene group having from 1 to 2 carbon atoms. n is an integer of from 1 to 3, and is preferably 3. m is an integer of from 1 to 5, and is preferably an integer of from 2 to 4, and particularly preferably 3.

According to the rubber composition of the present invention, when the azo compound represented by the formula (1) is used, the effect of greatly improving various performances of a rubber, such as decrease in heat build-up of a rubber, improvement in reinforcement, suppression in rising of Mooney viscosity and suppression in deterioration of scorch resistance can be achieved. When the azo compound represented by the formula (1') is used, the effect becomes particularly remarkable. It is considered that the improvement in those performances becomes remarkable when the azo compound represented by the formula (1) is obtained from a raw material having high 10 hour half-life temperature. The 10 hour half-life temperature of the raw material is preferably 50° C. or higher, and more preferably from 80 to 120° C.

The content of the azo compound (1) in the rubber composition of the present invention is preferably from 1 to 15 mass %, and more preferably from 1 to 10 mass %, based on the mass of silica. When the content of the azo compound (1) is 1 mass % or more based on the mass of silica, the effect of improving performance of a rubber that is the intention in the present invention is remarkably achieved. There is no problem even though the content exceeds 15 mass %. However, the content of 15 mass % or less is advantageous from the balance between cost and effect.

The rubber composition of the present invention can further contain a silane coupling agent other than the azo compound (1) in a range that the object of the present invention is not impaired. The kind of the silane coupling agent is not particularly limited, and silane coupling agents generally used in a rubber composition for a tire can be used. Examples of the silane coupling agent that can be used include sulfide silane and mercaptosilane. The amount of the silane coupling agent used other than the azo compound (1) is preferably from 1 to 15 mass % in terms of the total amount of the silane coupling agent and the azo compound (1) based on the mass of silica.

Other than the above-described reinforcing fillers and silane coupling agent, the rubber composition of the present invention can appropriately contain various additives generally used in a rubber composition for a tire, such as zinc white, stearic acid, an age resister, a wax and a vulcanizing agent. Examples of the vulcanizing agent include sulfur and a sulfur-containing compound. Although not particularly limited, the amount of the vulcanizing agent added is preferably from 0.1 to 10 parts by mass, and more preferably from 0.5 to 5 parts by mass, per 100 parts by mass of the rubber component. The rubber composition is prepared by kneading according to the conventional method using an ordinary kneading machine for a rubber, such as Banbury mixer or a kneader.

$^1$H-NMR (400 MHz, TMS standard=0.0 ppm): 1.34 (s, 12H, =NC(CH$_3$)$_2$—), 7.0 (s, 2H, —C(=O)NH—), 3.46 (q, 4H, NH—C$\underline{H_2}$—CH$_2$—), 1.85 (m, 4H, NH—CH$_2$—C$\underline{H_2}$—), 2.54 (q, 8H, —C$\underline{H_2}$—S—C$\underline{H_2}$—), 1.69 (m, 4H, —CH$_2$—S—CH$_2$—C$\underline{H_2}$—), 0.73 (t, 4H, —C$\underline{H_2}$—Si—(O—CH$_2$—CH$_3$)$_3$), 3.82 (q, 12H, —CH$_2$—Si—(O—C$\underline{H_2}$—CH$_3$)$_3$), 1.23 (t, 18H, —CH$_2$—Si—(OH—CH—C$\underline{H_3}$)$_3$).

$^{13}$C-NMR (400 MHz, TMS standard=0.0 ppm): 74.7 (=NC(CH$_3$)$_2$—), 23.1 (=NC(CH$_3$)$_2$—), 173.8 (—$\underline{C}$(=O)NH—), 38.6 (NH—$\underline{CH_2}$—CH$_2$—), 29.5 (NH—CH$_2$—$\underline{CH_2}$—), 29.2 (—CH$_2$—S—CH$_2$—), 35.2 (—$\underline{CH_2}$—S—CH$_2$—), 23.2 (—$\underline{CH_2}$—S—CH$_2$—CH$_2$—), 9.95 (—$\underline{CH_2}$—Si—(O—CH$_2$—CH$_3$)$_3$), 58.4 (—CH$_2$—Si—(O—$\underline{CH_2}$—CH$_3$)$_3$), 18.3 (—CH$_2$—Si—(O—CH$_2$—$\underline{CH_3}$)$_3$).

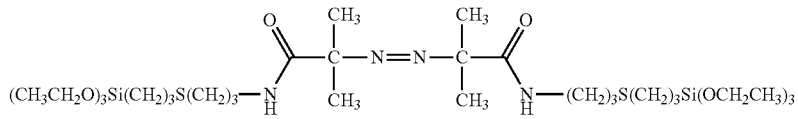

The rubber composition as described above can be used as a tread rubber or a sidewall rubber of a tire. When the rubber composition is, for example, vulcanization molded at from 140 to 180° C. according to the conventional method, a tire can be formed.

Examples of the present invention are described below, but the invention is not limited to those examples. Unless otherwise indicated, the formulation proportions shown below are all mass basis (parts by mass, mass % and the like).

Synthesis Example 1

Synthesis of 2,2'-azobis[2-methyl-N-(3-(3-(tri-ethoxy-silyl)propilthio)propyl)propionamide]

20 g of 2,2'-azobis[N-(2-propenyl)-2-methylpropionamide](VF-096, hour half-life temperature: 96° C., manufactured by Wako Pure Chemical Industries, Ltd.), 34.5 g of 3-mercaptopropyl triethoxysilane (manufactured by Tokyo Chemical Industry Co., Ltd.), 0.66 g of 2,2'-azobis(4-methoxy-2,4-dimethyl-valeronitrile) (V-70, 10 hour half-life temperature: 30° C., manufactured by Wako Pure Chemical Industries, Ltd.) and 55 g of toluene were placed in an eggplant flask. The flask was purged with nitrogen for 20 minutes while stirring with a magnetic stirrer, and then capped tightly. The flask containing a reaction solution was placed in a water bath maintained at 35° C., and reaction was conducted for 2 hours while stirring. The reaction product obtained was concentrated by an evaporator, and then purified by column chromatography.

The reaction product after purification was subjected to $^1$H-NMR and $^{13}$C-NMR analyses, and it was conformed that the reaction product is 2,2'-azobis[2-methyl-N-(3-(3-(tri-ethoxysilyl)propylthio)propyl)propionamide]. The results of $^1$H-NMR and $^{13}$C-NMR analyses are shown below.

Synthesis Example 2

Synthesis of 2,2'-azobis[2-methyl-N-(3-(3-(tri-methoxy-silyl)propylthio)propyl)propionamide]

20 g of 2,2'-azobis[N-(2-propenyl)-2-methylpropionamide](VF-096, manufactured by Wako Pure Chemical Industries, Ltd.), 33.5 g of 3-mercaptopropyl trimethoxysilane (manufactured by Tokyo Chemical Industry Co., Ltd.), 0.66 g of 2,2'-azobis(4-methoxy-2,4-dimethylvaleronitrile) (V-70, manufactured by Wako Pure Chemical Industries, Ltd.) and 55 g of toluene were placed in an eggplant flask. The flask was purged with nitrogen for 20 minutes while stirring with a magnetic stirrer, and then capped tightly. The flask containing a reaction solution was placed in a water bath maintained at 35° C., and reaction was conducted for 2 hours while stirring. The reaction product obtained was concentrated by an evaporator, and then purified by column chromatography.

The reaction product after purification was subjected to $^1$H-NMR and $^{13}$C-NMR analyses, and it was conformed that the reaction product is 2,2'-azobis[2-methyl-N-(3-(3-(tri-methoxysilyl)propylthio)propyl)propionamide]. The results of $^1$H-NMR and $^{13}$C-NMR analyses are shown below.

$^1$H-NMR (400 MHz, TMS standard=0.0 ppm): 1.34 (s, 12H, =NC(CH$_3$)$_2$—), 7.0 (s, 2H, —C(=O)NH—), 3.46 (q, 4H, NH—C$\underline{H_2}$—CH$_2$—), 1.85 (m, 4H, NH—CH$_2$—C$\underline{H_2}$—), 2.54 (q, 8H, —C$\underline{H_2}$—S—C$\underline{H_2}$—), 1.69 (m, 4H, —CH$_2$—S—CH$_2$—C$\underline{H_2}$—), 0.72 (t, 4H, —C$\underline{H_2}$—Si—(O—CH$_3$)$_3$), 3.55 (s, 18H, —CH$_2$—Si—(OCH$_3$)$_3$).

$^{13}$C-NMR (400 MHz, TMS standard=0.0 ppm): 74.7 (=NC(CH$_3$)$_2$—), 23.1 (=NC(CH$_3$)—), 173.8 (—C(=O)NH—), 38.6 (NH—$\underline{CH_2}$—CH$_2$—), 29.5 (NH—CH$_2$—$\underline{CH_2}$—), 29.2 (—CH$_2$—S—CH$_2$—), 35.2 (—CH$_2$—S—$\underline{CH_2}$—), 23.2 (—$\underline{CH_2}$—S—CH$_2$—CH$_2$—), 9.94 (—$\underline{CH_2}$—Si—(O—CH$_3$)$_3$), 50.2 (—CH$_2$—Si—(O—CH$_3$)$_3$).

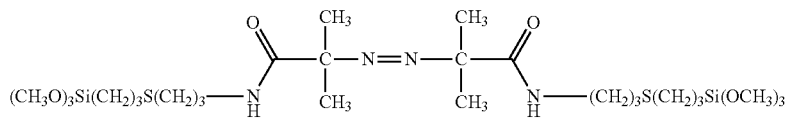

Use Example of the Azo Compound as Polymerization Initiator of Methyl Methacrylate 50 g of methyl methacrylate (manufactured by Tokyo Chemical Industry Co., Ltd.), 2.5 g of the azo compound obtained in Synthesis Example 1 above, and 50 g of toluene were placed in an eggplant flask, and the flask was purged with nitrogen while stirring with a magnetic stirrer for 15 minutes, and then capped tightly. Reaction was conducted for 3 hours while stirring in an oil bath maintained at 95° C. The resulting reaction solution was purified by reprecipitation with ethanol to obtain a reaction product.

The reaction product obtained was subjected to $^1$H-NMR and $^{13}$C-NMR analyses, and a molecular weight thereof was measured by gel permeation chromatography. It was confirmed that a methyl methacrylate polymer (number average molecular weight: 100,000, mass average molecular weight: 250,000) was obtained. It is seen from the results that the alkoxysilyl group-containing azo compound according to the examples of the present invention has radical polymerization initiation ability.

Production Example of Rubber Composition

According to the formulations (unless otherwise indicated, parts by mass) shown in Tables 1 and 2 below, components excluding sulfur and a vulcanization accelerator were mixed, and sulfur and a vulcanization accelerator were then added and mixed therewith to prepare a rubber composition for a tire. Details of each blend in Tables 1 and 2 are as follows.

SBR 1: SBR 1502, manufactured by JSR Corporation
SBR 2: SBR 0122, manufactured by JSR Corporation
Carbon black: SEAST 3, manufactured by Tokai Carbon Co., Ltd.
Silica: Ultrasil VN 3, manufactured by Evonik Industries
Silane coupling agent: Si 75, manufactured by Evonik Industries
Azo compound A: 2,2'-azobis[N-(2-propenyl)-2-methylpropionamide]represented by the following formula (manufactured by Wako Pure Chemical Industries, Ltd.):

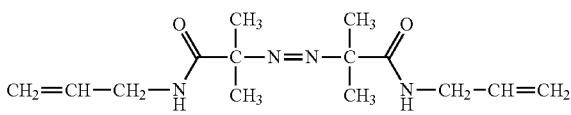

Azo compound B: Alkoxysilyl group-containing azo compound obtained in Synthesis Example 1

Oil: Extract #4 S, manufactured by Showa Shell Sekiyu K.K.
Zinc white: Zinc White #1, manufactured by Mitsui Mining & Smelting Co., Ltd.
Stearic acid: LUNAC S20, manufactured by Kao Corporation
Age resister: NOCRAC 6C, manufactured by Ouchi Shinko Chemical Industrial Co., Ltd.
Wax: OZOACE 0355, manufactured by Nippon Seiro Co., Ltd.
Sulfur: Sulfur Powder, manufactured by Tsurumi Chemical Industry Co., Ltd.
Vulcanization accelerator I: SOXINOL CZ, manufactured by Sumitomo Chemical Co., Ltd.
Vulcanization accelerator 2: NOCCELER D, manufactured by Ouchi Shinko Chemical Industrial Co., Ltd.

Heat build-up characteristic, 300% modulus, Mooney viscosity and scorch resistance of each rubber composition obtained above were measured and evaluated by the following methods. The results obtained are shown in Tables 1 and 2.

Heat build-up characteristic: Loss factor tan δ was measured under conditions of temperature: 70° C., frequency: 10 Hz, static strain: 10% and dynamic strain: 2%, according to JIS K6394, and was indicated as an index when the value of Comparative Example 1 is 100. The result shows that as the index is smaller, tan δ is smaller, which is lower heat build-up, that is, heat build-up characteristic is excellent.

300% tensile modulus: Tensile test (dumbbell #3 form) was conducted according to JIS K6251, and modulus value when 300% elongation was indicated as an index when the value of Comparative Example 1 is 100. The result shows that as the value is larger, modulus is higher and strength (reinforcement) is excellent.

Mooney viscosity: Mooney viscosity ML (1+4) at 100° C. was measured according to JIS K6300, and was indicated as an index when the value of Comparative Example 1 is 100. The result shows that as the index is smaller, viscosity is lower, and processability is excellent.

Scorch resistance: t5 value was measured at 125° C. after preheated for 1 minute using a Mooney scorch tester (L-shaped rotor) according to JIS K6330-1, and was indicated as an index when the value of Comparative Example 1 is 100. The result shows that as the index is larger, scorch is more difficult to occur and scorch resistance is excellent.

TABLE 1

|  | Comparative Example 1 | Comparative Example 2 | Comparative Example 3 | Example 1 | Example 2 |
| --- | --- | --- | --- | --- | --- |
| SBR 1 | 80 | 80 | 80 | 80 | 80 |
| SBR 2 | 20 | 20 | 20 | 20 | 20 |
| Carbon black | 20 | 20 | 20 | 20 | 20 |
| Silica | 60 | 60 | 60 | 60 | 60 |
| Silane coupling agent | 5 | 3 | 1 | 3 | 1 |
| Azo compound A |  | 2 | 5 |  |  |
| Azo compound B |  |  |  | 2 | 4 |
| Oil | 30 | 30 | 30 | 30 | 30 |

TABLE 1-continued

|  | Comparative Example 1 | Comparative Example 2 | Comparative Example 3 | Example 1 | Example 2 |
|---|---|---|---|---|---|
| Zinc white | 2 | 2 | 2 | 2 | 2 |
| Stearic acid | 2 | 2 | 2 | 2 | 2 |
| Age resister | 2 | 2 | 2 | 2 | 2 |
| Wax | 2 | 2 | 2 | 2 | 2 |
| Sulfur | 2 | 2 | 2 | 2 | 2 |
| Vulcanization accelerator 1 | 1.5 | 1.5 | 1.5 | 1.5 | 1.5 |
| Vulcanization accelerator 2 | 1.5 | 1.5 | 1.5 | 1.5 | 1.5 |
| Heat build-up characteristic (Index) | 100 | 108 | 11 | 89 | 82 |
| 300% Tensile modulus (Index) | 100 | 82 | 65 | 106 | 112 |
| Mooney viscosity (Index) | 100 | 120 | 138 | 101 | 103 |
| Scorch resistance (Index) | 100 | 102 | 103 | 99 | 96 |

As is seen from the results shown in Table 1, reinforcement was decreased and heat build-up was increased in Comparative Examples 2 and 3 in which the azo compound A was added, as compared with Comparative Example 1. The reason for this is considered due to that the azo compound A does not have an alkoxysilyl group, and silica dispersion action is small. On the other hand, in Examples 1 and 2 in which the azo compound B having high 10 hour half-life temperature of a raw material azo compound was added, heat build-up was decreased and reinforcement was increased. In addition to those, increase in Mooney viscosity was suppressed and great deterioration of scorch resistance was suppressed.

TABLE 2

|  | Comparative Example 4 | Comparative Example 5 | Comparative Example 6 | Example 3 | Example 4 |
|---|---|---|---|---|---|
| SBR 1 | 60 | 60 | 60 | 60 | 60 |
| Natural rubber | 40 | 40 | 40 | 40 | 40 |
| Carbon black | 20 | 20 | 20 | 20 | 20 |
| Silica | 60 | 60 | 60 | 60 | 60 |
| Silane coupling agent | 5 | 3 | 1 | 3 | 1 |
| Azo compound A |  | 2 | 5 |  |  |
| Azo compound B |  |  |  | 2 | 4 |
| Oil | 30 | 30 | 30 | 30 | 30 |
| Zinc white | 2 | 2 | 2 | 2 | 2 |
| Stearic acid | 2 | 2 | 2 | 2 | 2 |
| Age resister | 2 | 2 | 2 | 2 | 2 |
| Wax | 2 | 2 | 2 | 2 | 2 |
| Sulfur | 2 | 2 | 2 | 2 | 2 |
| Vulcanization accelerator 1 | 1.5 | 1.5 | 1.5 | 1.5 | 1.5 |
| Vulcanization accelerator 2 | 1.5 | 1.5 | 1.5 | 1.5 | 1.5 |
| Heat build-up characteristic (Index) | 100 | 112 | 121 | 86 | 79 |
| 300% Tensile modulus (Index) | 100 | 83 | 66 | 105 | 112 |
| Mooney viscosity (Index) | 100 | 115 | 134 | 102 | 104 |
| Scorch resistance (Index) | 100 | 99 | 97 | 99 | 95 |

It is seen from the results shown in Table 2 above that similar to the results shown in Table 1, in Comparative Examples 5 and 6 in which the azo compound free of an alkoxysilyl group is used, reinforcement is decreased and heat build-up is increased, as compared with Comparative Example 4. In Examples 3 and 4 in which the azo compound B was added, heat build-up was decreased and reinforcement was increased. In addition to those, increase in Mooney viscosity was suppressed, and deterioration of scorch resistance was suppressed.

What is claimed is:

1. An alkoxysilyl group-containing azo compound represented by the following formula (1):

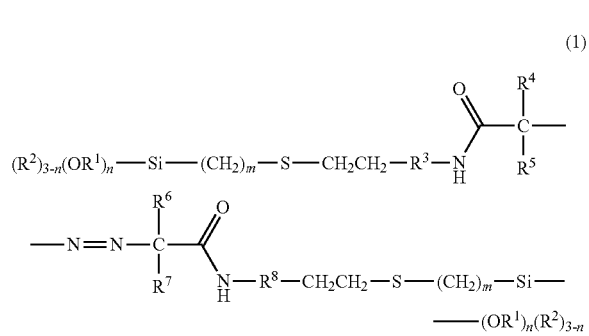

(1)

wherein $R^1$ and $R^2$ each independently represent an alkyl group having from 1 to 3 carbon atoms. $R^3$ and $R^8$ each independently represent an alkylene group having from 1 to 3 carbon atoms, $R^4$, $R^5$, $R^6$ and $R^7$ each independently represent hydrogen or an alkyl group having from 1 to 3 carbon atoms, n is an integer of from 1 to 3, and m is an integer of from 1 to 5.

2. A method for producing an alkoxysilyl group-containing azo compound, which comprises reacting a compound represented by the following formula (2):

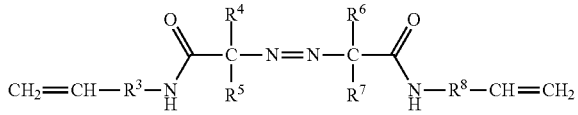

(2)

wherein $R^3$ and $R^8$ each independently represent an alkylene group having from 1 to 3 carbon atoms, and $R^4$, $R^5$, $R^6$ and $R^7$ each independently represent hydrogen or an alkyl group having from 1 to 3 carbon atoms;

and a compound represented by the following formula (3):

(3)

wherein $R^1$ and $R^2$ each independently represent an alkyl group having from 1 to 3 carbon atoms, n is an integer of from 1 to 3, and m is an integer of from 1 to 5, thereby producing the alkoxysilyl group-containing azo compound according to claim 1.

3. The method for producing an alkoxysilyl group-containing azo compound according to claim 2, comprising using a radical generator as a reaction catalyst.

4. A rubber composition comprising the alkoxysilyl group-containing azo compound represented by the formula (1) according to claim 1.

5. The rubber composition according to claim 4, containing a compound represented by the following formula (1'):

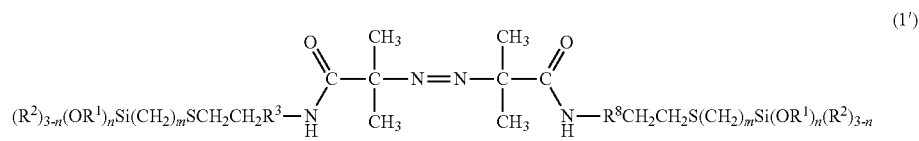

(1')

wherein $R^1$ and $R^2$ each independently represent an alkyl group having from 1 to 3 carbon atoms, $R^3$ and $R^8$ each independently represent an alkylene group having from 1 to 3 carbon atoms, n is an integer of from 1 to 3, and m is an integer of from 1 to 5, as the alkoxysilyl group-containing azo compound.

6. A pneumatic tire using the rubber composition according to claim 4.

7. A pneumatic tire using the rubber composition according to claim 5.

* * * * *